No. 874,887. PATENTED DEC. 24, 1907.
F. J. FELDT.
BROADCAST SEEDING MACHINE.
APPLICATION FILED MAR. 12, 1906.
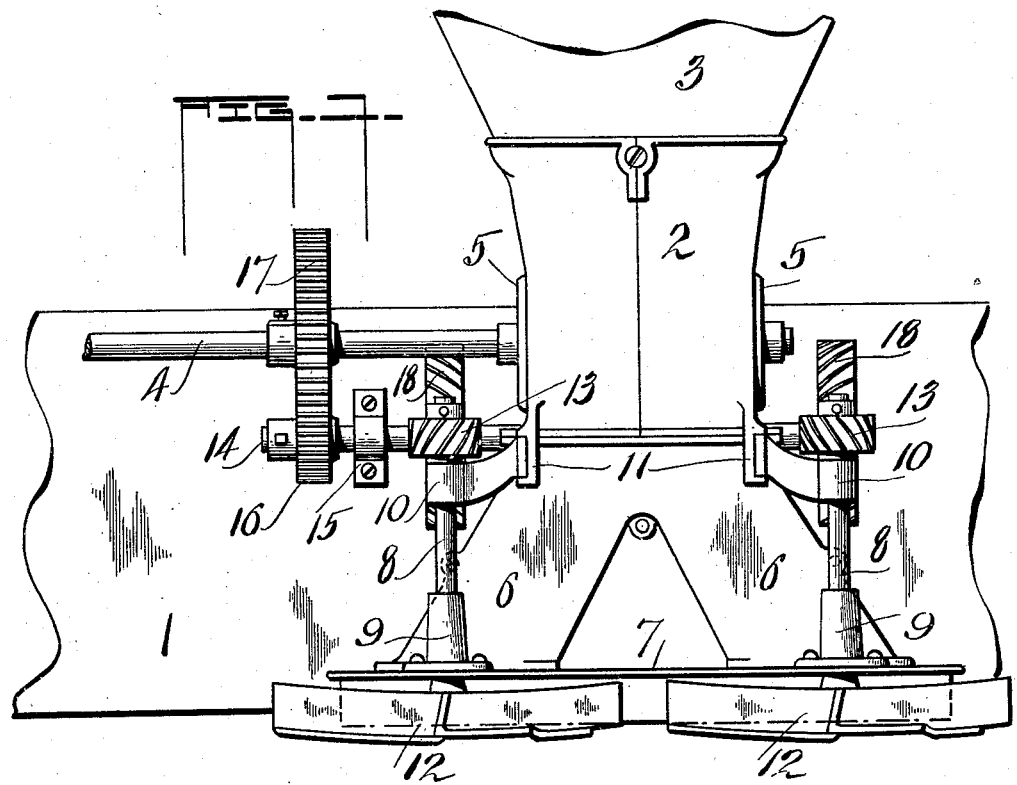
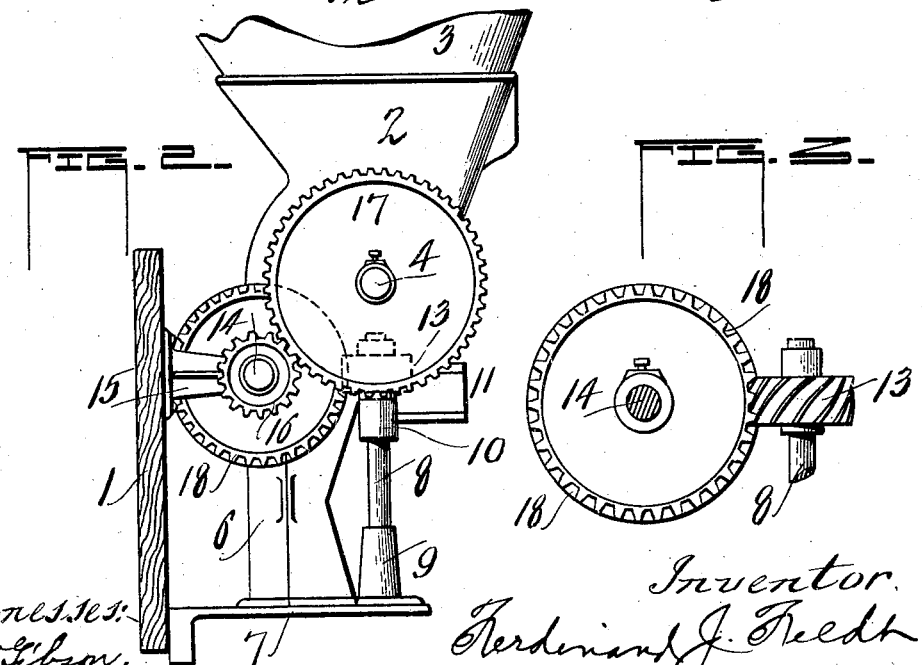

UNITED STATES PATENT OFFICE.

FERDINAND J. FELDT, OF PEORIA, ILLINOIS.

BROADCAST SEEDING-MACHINE.

No. 874,887.  Specification of Letters Patent.  Patented Dec. 24, 1907.

Application filed March 12, 1906. Serial No. 305,578.

*To all whom it may concern:*

Be it known that I, FERDINAND J. FELDT, a citizen of the United States, residing at Peoria, in the county of Peoria and State of Illinois, have invented certain new and useful Improvements in Broadcast Seeding-Machines; and I do hereby declare that the following is a full, clear, and exact description of the invention, which will enable others skilled in the art to which it appertains to make and use the same.

This invention has reference to certain new and useful improvements in broadcast seeding machines, and relates particularly to the means employed for the transmission of motion from a driving shaft adapted to operate suitable seeding devices within a hopper, and to distributers suitably disposed to receive material from the said hopper and to distribute the same broadcast over the ground.

The invention consists essentially of a hopper having one or more discharge spouts leading therefrom and the same supported from a suitable support such as the end-gate of a wagon; a driving shaft adapted to operate suitable seeding devices within the hopper; one or more distributer shafts on which are carried distributing fans disposed beneath the said spout or spouts to receive material discharged therefrom; a counter-shaft extending parallel with the driving shaft; spur gears connecting the driving and counter-shafts; and spiral gears connecting the counter-shafts and said distributer shaft or shafts, said spiral gears provided with teeth which extend diagonally across the faces thereof, the teeth of the opposite gears extending diagonally across their faces in opposite directions to each other.

For a further and full description of the invention herein and the merits thereof, and also to acquire a knowledge of the details of construction of the means for effecting the results, reference is had to the following description and the drawings hereto attached.

While the essential and characteristic features of the invention are susceptible of modification, still the preferred embodiment of the invention is illustrated in the accompanying drawings, in which;—

Figure 1 is a view from the rear in elevation of so much of a broadcast distributing machine as will illustrate my improvements which are attached thereto; Fig. 2 is a side elevation looking at the left hand side of Fig. 1, with the distributer omitted, and Fig. 3 is a detail in side elevation of the spiral gears on the counter-shaft in mesh with the spiral pinion on a distributer shaft.

Like numerals of reference indicate corresponding parts throughout the figures.

In the drawings I have shown my invention as applied to a double fan distributer, necessitating two distributing shafts and duplicate means on a driving shaft which co-operates therewith for actuating the said distributer. However, it is understood that the mechanism herein shown and described is equally as applicable to a single distributer seeding machine as it is to a double fan distributer. In the drawings I have also illustrated a preferred form of hopper and connections therewith, and a preferred form of distributer, yet it is to be understood that the devices which I claim as my improvement may be applied to other forms of machines than that here shown.

In the drawings 1 denotes a support for the seeding devices which is preferably an end-gate of a wagon, which is of the usual type and adapted to have a detachable connection with the rear end of a suitable vehicle.

2 refers to a hopper support in which is adapted to be carried suitable seeding devices (not shown) which may be of the usual force feed type or other suitable feeding means, and 3 denotes a hopper extending up from and supported by the said hopper support.

The feeding devices to which reference has been made, but not shown, are adapted to be actuated by a longitudinal driving shaft 4 which passes through the hopper support 2 and is journaled in the bearing plates 5 attached thereto. The driving shaft 4 is adapted, when attaching the seeding devices to the vehicle, to be driven through suitable connection with one of the ground wheels of the vehicle, or the same may be driven in any other desirable or convenient manner.

Depending and diverging from the hopper support 2 and communicating with the feeding devices therein, are the feed spouts 6 which at their lower ends are connected and supported upon a plate or shield 7, through which may be provided suitable openings, not shown, to direct any material discharged through the spouts 6 on to fan distributers to be described.

8 denotes, preferably, a pair of vertically disposed distributer shafts, the lower ends of which pass through the shield 7 and are journaled in the bearings 9 supported by the said shield. The upper ends of the said shafts pass through the bearings 10 which project laterally from and are supported by the arms 11 which extend outwardly from the lower opposite sides of the hopper support 2. On the lower ends of the shafts beneath the shield 7 are carried the fan distributers 12, which are so disposed beneath the shield as to receive any material which may be discharged through the shield from the spouts 6, while on the extreme upper ends of the said shafts are carried spiral gears 13; that is, they are of the same form as the ordinary spur gears, but the teeth extend diagonally across the faces thereof.

14 denotes a longitudinally disposed counter-shaft, which may be carried at the rear of or through the hopper support, which will serve as a bearing therefor and the shaft also is journaled in a bracket 15 attached to and projecting from the support or end-gate 1.

16 is a spur pinion carried by the shaft 14 which is continuously in mesh with a spur gear 17 carried on the driving shaft 4, through and by means of which the power which is transmitted to the shaft 4 will be imparted to the counter-shaft 14.

Carried by the counter-shaft 14 is a pair of spiral gears 18, the teeth of which are similar to the pinions 13, and said pinions 13 and gears 18 are continuously in mesh for the purpose of transmitting power from the counter-shaft 4 to the distributer shafts 8 for the rotation of the distributers thereon. The gears 18 and pinions 13 are disposed approximately at right angles to each other, and the teeth of each of said spiral pinions and their intermeshing gears, while disposed diagonally across the face thereof, also extend in opposite directions to each other as shown. The application of gearing of the character described for transmitting motion of a driving shaft of a seeding machine to the fan distributers thereof, provides a drive which is practically noiseless, and simplifies the construction and arrangement of such parts.

Having thus fully described my invention, what I claim and desire to secure by Letters Patent of the United States, is;—

In a device of the class described, a supporting member, a combined shield and bracket extending laterally from said supporting member, a hopper support having a hopper extending from one end and feed spouts depending from the other end and connected to said shield and bracket, a drive shaft and a counter shaft journaled through said hopper support and spaced apart, arms extending from said hopper support, hangers connected to said arms and provided with vertical shaft bearings in their free ends, shaft bearings carried by said shield and bracket in vertical alinement with the bearings of said hangers, vertical shafts carried by said shield and bracket and by said hanger bearings, distributer devices carried by the lower ends of said vertical shafts, means for communicating the motion of said drive shaft to said counter shaft, and means for transmitting the motion from said counter shaft to said vertical shafts.

In testimony whereof I affix my signature, in presence of two witnesses.

FERDINAND J. FELDT.

Witnesses:
   CHAS. W. LA PORTE,
   ROBT. N. MCCORMICK.